United States Patent
Arndt et al.

(10) Patent No.: US 10,571,204 B2
(45) Date of Patent: Feb. 25, 2020

(54) INDIRECT GAS COOLER

(71) Applicant: Modine Manufacturing Company, Racine, WI (US)

(72) Inventors: Daniel Arndt, Reutlingen (DE); Alexander Riebel, Stuttgart (DE); Marius Dornseif, Filderstadt (DE)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 15/227,005

(22) Filed: Aug. 3, 2016

(65) Prior Publication Data
US 2017/0038168 A1 Feb. 9, 2017

(30) Foreign Application Priority Data

Aug. 8, 2015 (DE) .......... 10 2015 010 287

(51) Int. Cl.
*F28F 9/00* (2006.01)
*F28F 3/08* (2006.01)
(Continued)

(52) U.S. Cl.
CPC .......... *F28F 9/001* (2013.01); *F28D 9/0043* (2013.01); *F28F 3/086* (2013.01); (Continued)

(58) Field of Classification Search
CPC .. F28F 3/08; F28F 3/083; F28F 9/0231; F28F 2265/18; F28F 9/0246; F28F 3/086; (Continued)

(56) References Cited

U.S. PATENT DOCUMENTS 2,170,214 A * 8/1939 Morrow ................ F28F 9/0231
137/247.25
3,533,465 A * 10/1970 Bennett ................ F28F 9/0231
123/41.27
(Continued)

FOREIGN PATENT DOCUMENTS

DE 3330710 A1 9/1982
DE 4328448 C2 8/1995
DE 102005005043 A1 8/2006

OTHER PUBLICATIONS

Chinese Patent Office Action for Application No. 201610634767.9 dated Feb. 5, 2018 (24 pages, English translation included).
(Continued)

*Primary Examiner* — Christopher R Zerphey
*Assistant Examiner* — For K Ling
(74) *Attorney, Agent, or Firm* — Michael Best & Friedrich LLP; Jeroen Valensa; Michael Bergnach

(57) ABSTRACT

An indirect gas cooler is constructed from stacked pairs of plates with fins arranged in between. The stack is arranged in a housing into which the gas flows, flows through the fins, and leaves the housing again. The gas is in thermal exchange with the liquid that flows in the plate pairs and that is introduced into the plate pairs via at least one inlet and is discharged via at least one outlet. A ventilating member is provided in the stack for discharging entrained gases from the liquid. The ventilating member is formed from aligned plate openings which produce a ventilating duct that is hydraulically connected with a liquid space in the stack. The indirect gas cooler can be used to cool compressed charge air for an internal combustion engine.

14 Claims, 7 Drawing Sheets

(51) Int. Cl.
*F28D 9/00* (2006.01)
*F28F 9/02* (2006.01)
*F28D 21/00* (2006.01)

(52) U.S. Cl.
CPC ...... *F28D 2021/0082* (2013.01); *F28F 9/028* (2013.01); *F28F 2265/18* (2013.01); *F28F 2275/04* (2013.01)

(58) Field of Classification Search
CPC .......... F28D 9/0043; F28D 2021/0082; F28D 9/0075; F01P 11/028; F01P 11/029; F01P 11/0285
USPC .................................. 165/166, 278
See application file for complete search history.

(56) References Cited

U.S. PATENT DOCUMENTS

| | | | | |
|---|---|---|---|---|
| 3,604,502 | A * | 9/1971 | Morse | F01P 11/0276 123/41.27 |
| 4,011,905 | A * | 3/1977 | Millard | F28D 1/0333 123/41.27 |
| 4,480,598 | A * | 11/1984 | Berrigan | F01P 11/029 123/41.27 |
| 4,592,418 | A * | 6/1986 | Cadars | B01D 19/0042 123/41.54 |
| 5,575,329 | A | 11/1996 | So et al. | |
| 5,680,897 | A * | 10/1997 | Kilmer | F28D 1/0341 165/153 |
| 7,669,643 | B2 * | 3/2010 | Ekelund | F28D 9/005 165/111 |
| 2007/0181105 | A1 * | 8/2007 | Bazika | F02B 29/0462 123/563 |
| 2011/0108252 | A1 | 5/2011 | Contet et al. | |
| 2011/0168366 | A1 | 7/2011 | Garret et al. | |
| 2012/0285423 | A1 * | 11/2012 | Nguyen | F02B 29/0475 123/542 |

OTHER PUBLICATIONS

The National Intellectual Property Administration, PRC, Notification of the Second Office Action, Chinese Patent Application No. 201610634767.9, dated Oct. 8, 2018.
The National Intellectual Property Administration, PRC, Notification of the Third Office Action, Chinese Patent Application No. 201610634767.9, dated Apr. 3, 2019 (13 pages).
Examination Report for Indian Patent Application No. 201614026206, Intellectual Property India dated Jun. 28, 2019 (6 pages).
1st Substantive Examination Requirement for Mexican Patent Application No. Mx/a/2016/010246, Instituto Mexicano de la Propriedad Industrial dated Aug. 27, 2019 (4 pages).

* cited by examiner

Section view A-A

Isometric view

Isometric view

A-A

INDIRECT GAS COOLER

CROSS-REFERENCE TO RELATED APPLICATIONS

This application claims priority to German Patent Application No. 10 2015 010287, filed Aug. 8, 2015, the entire contents of which are hereby incorporated by reference herein.

BACKGROUND

The invention relates to an indirect gas cooler, in which the gas, for example compressed charge air for an internal combustion engine is cooled by means of a liquid, the air cooler being constructed from stacked pairs of plates with fins which are arranged in between, and being arranged in a housing, into which the gas flows, flows through the fins and leaves the housing again, said housing being in thermal exchange with the liquid which flows in the plate pairs, can be introduced into the plate pairs via at least one inlet and via plate openings which are aligned in the stack, and can be discharged via at least one outlet by means of other aligned plate openings, and having a ventilating member for discharging entrained air in the liquid.

The described indirect gas cooler was filed recently at the DPMA and was given the reference number DE 10 2014 012 179.8. The ventilating member of the earlier application consists of an inserted small tube.

SUMMARY

It is one object of the invention to propose alternative embodiments of the earlier application which permit effective ventilation, without it being necessary for a small tube or additional component of the like to be inserted, as a result of which possibly costs are to be reduced and other advantages are to be achieved.

One aspect of the invention consists in that the ventilating member is formed from further aligned plate openings which produce a ventilating duct which is in a connection with a liquid space which is present in the stack. The liquid space is preferably an outlet collecting space which is configured in the stack for the liquid.

All the plates preferably have the abovementioned further aligned plate openings, for which reason the ventilating duct extends through the entire stack.

It is advantageous in terms of design and manufacturing technology if the further aligned plate openings are preferably of identical configuration with regard to their edge formation to the aligned inlet-side and to the aligned outlet-side plate openings. However, they are preferably considerably smaller with regard to their cross-sectional size than the inlet-side and/or the outlet-side plate openings.

The further aligned plate openings are very preferably also situated in the vicinity of the abovementioned plate openings, in order for it to be possible to produce a very short hydraulic connection, for example, from an outlet space for the liquid toward the ventilating duct which is formed from the further plate openings.

The ventilating member comprises a connecting duct to the liquid space which is preferably the outlet-side collecting space, and a connection stub or a line which extends through an opening to outside of the housing.

It is of particular advantage in terms of manufacturing technology that the entire ventilating member is a constituent part of the brazed stack, that is to say the ventilating member is also brazed in one step with the hard brazing of the stack in a brazing furnace and accordingly does not have to be subsequently installed. As a result, the mechanical seal which was necessary in the abovementioned older application but which is often unreliable becomes superfluous.

The invention will be described in two exemplary embodiments using the appended drawings. The description can contain further features which can prove to be essential distinguishing features.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

By way of the indirect gas cooler which is depicted in the illustrations, compressed charge air for an internal combustion engine is cooled by means of a liquid. It might also be an exhaust gas or another gas mixture. The use of the gas cooler in conjunction with an internal combustion engine is also optional.

Figure 1:
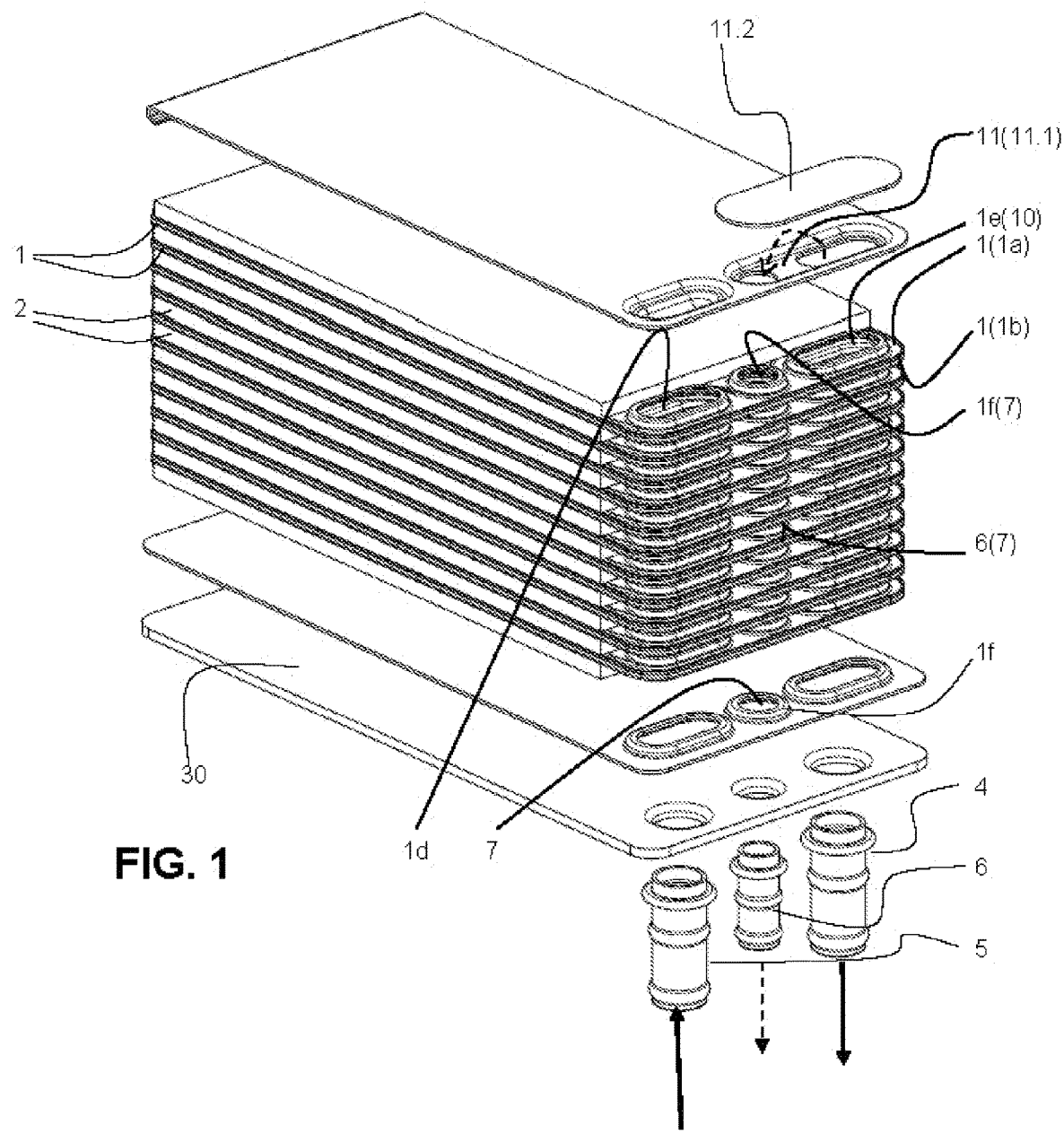
FIG. 1 shows a stack of plates and fins of a gas cooler in a first exemplary embodiment, partially in an exploded illustration.
Figure 2:
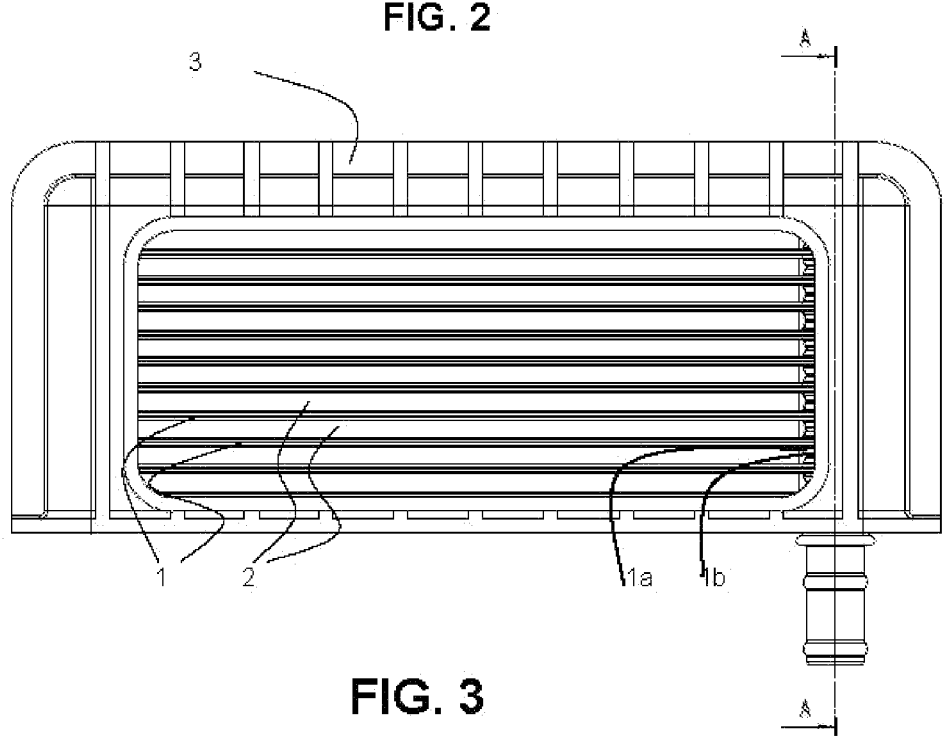
FIG. 2 shows the stack from FIG. 1, arranged in a housing.
Figure 4:
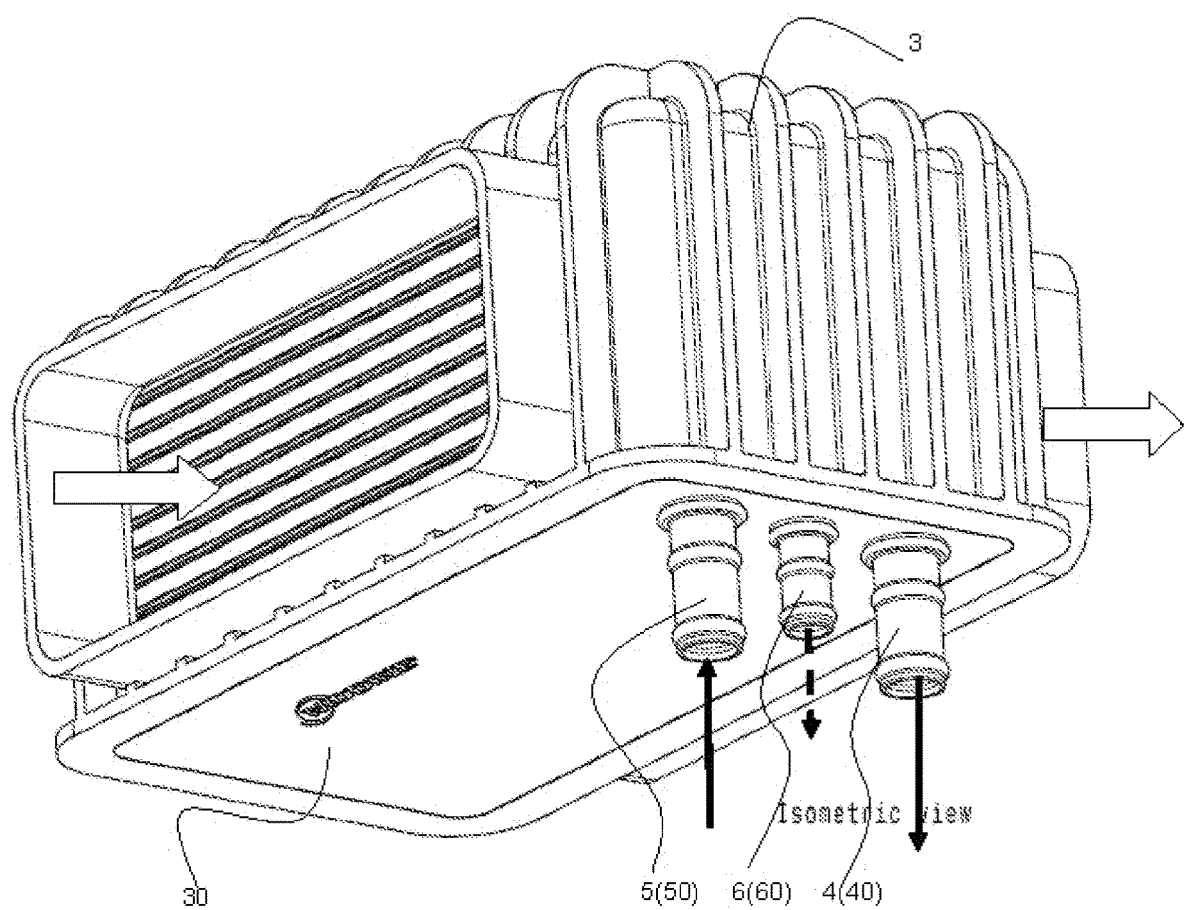
FIG. 4 shows a perspective view of the subject matter according to FIG. 2.

The gas cooler is constructed from stacked pairs 1a, 1b of plates 1 with fins 2 which are arranged in between. The stack is arranged in a housing 3. The charge air flows into the housing 3, flows through the fins 2 and subsequently leaves the housing 3 in the cooled state (FIGS. 2 and 4). The liquid which brings about the abovementioned cooling action flows in the plate pairs 1a, 1b. The liquid flows into the plate pairs 1a, 1b via an inlet 5 and via inlet-side plate openings 1d which are aligned in the stack. After flowing through ducts which are present in the plate pairs 1a, 1b, said liquid is discharged again via at least one outlet 4 by means of aligned outlet-side plate openings 1e (FIG. 1, inter alia).

Entrained gas is sometimes present in the liquid, which impairs the efficiency of the heat exchanger as is known. In order to remove the entrained gas at least largely from the liquid, a ventilating member 6 is provided in the stack.

The ventilating member 6 is formed from further aligned plate openings 1$f$ which produce a ventilating duct 7. The ventilating duct 7 is in a hydraulic connection 11 with a liquid space 10 which is present in the stack. The liquid space 10 is the outlet collecting space which is produced by way of the outlet-side plate openings 1$d$ which are aligned in the stack.

The selection of the inlet space as liquid space 10 causes the entrained gas to be removed before it flows through the plate pairs 1$a$, 1$b$. Nevertheless, the liquid circulates in a closed circuit, and it is important to export the entrained gas from the circuit.

As can be seen directly from most figures, the plate openings 1$f$ which form the ventilating duct 7 are situated close beside the outlet-side plate openings 1$d$. This has the advantage that the hydraulic connection 11 can be very short.

In relation to the positions of inlet 5 and outlet 4 which are present in the exemplary embodiments, it is relatively appropriate that the plate openings 1$f$ which form the ventilating duct 7 are arranged between the inlet-side and the outlet-side plate openings 1$d$, 1$e$.

Figure 5:
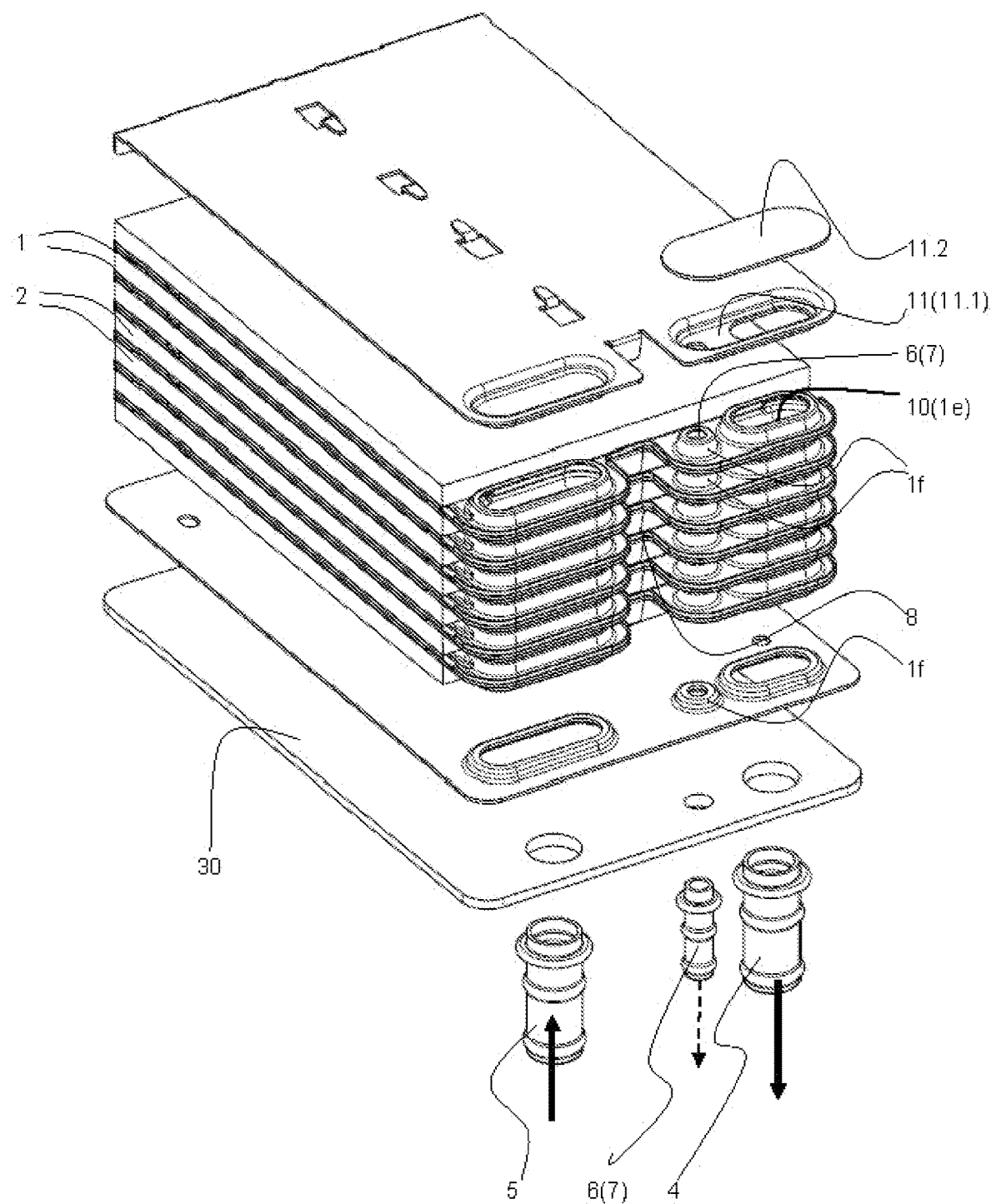
FIG. 5 shows a second exemplary embodiment in a view which is similar to FIG. 1.
Figure 6:
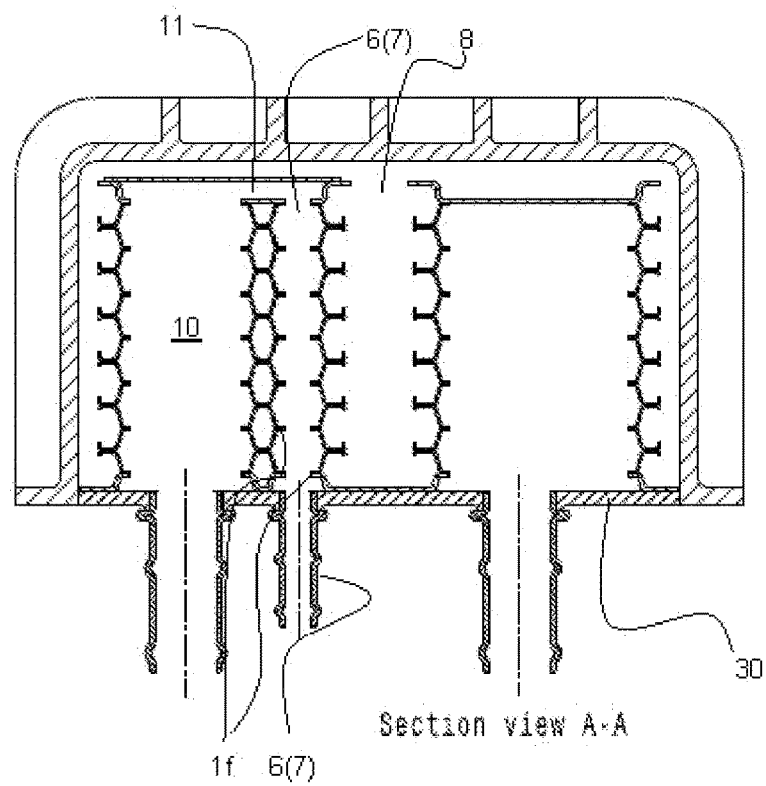
FIG. 6 shows a section through the second exemplary embodiment in a similar manner to FIG. 3.

In conjunction with the above, it is then provided that the plates 1$a$, 1$b$ are configured with a plate cut-out 8 which lies between the inlet 5 and the outlet 4, the further aligned plate openings 1$f$ and the inlet-side plate openings 1$d$ being arranged on one side of the plate cut-out 8 and the outlet-side plate openings 1$e$ being arranged on the other side of the plate cut-out 8 (FIGS. 5 and 6).

FIGS. 1, 9, 10 and 11 show embodiments without plate cut-outs 8.

Figure 11:
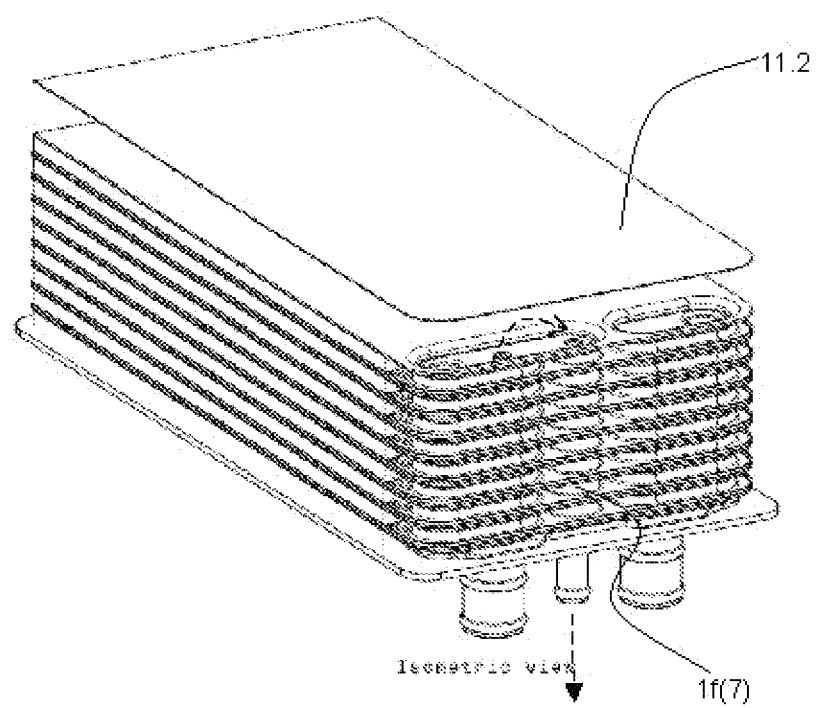

The hydraulic connection 11 which has already been addressed is realized by means of a connecting duct 11.1 which extends along an upper plate and comprises a covering part 11.2 which lies on the upper plate. Configuring the duct 11.1 on the upper plate is favorable with regard to the effectiveness, and it also appears to be advantageous in terms of the implementation. There are various designs with regard to the covering plate 11.2. In FIG. 11, a further plate of the same size is placed onto the upper plate, which further plate represents the covering plate 11.2. Since the plate thicknesses have been reduced considerably, something of this type can be advantageous. In FIGS. 1, 3, 5 and 6, a relatively small, planar covering plate 11.2 has been used, in order to configure the connecting duct 11.1. In the embodiment according to FIGS. 7 and 8, the covering plate 11.2 is of even somewhat smaller design and has a molded bead. Advantages can be associated with the different designs with regard to the behavior in respect of internal pressure.

Figure 3:
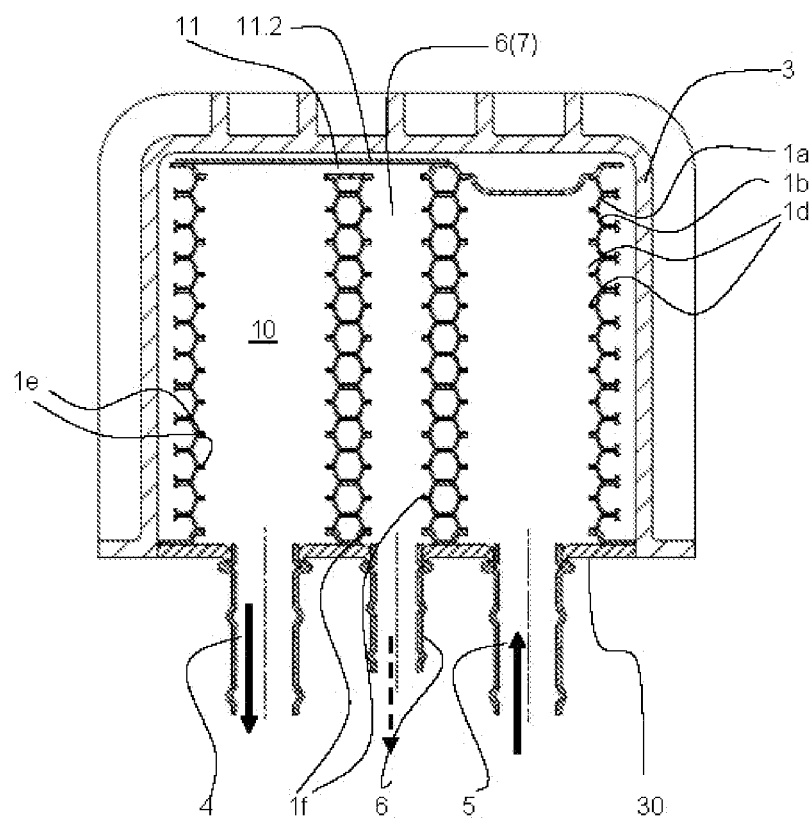
FIG. 3 shows a section A-A from FIG. 2.

It is advantageous that the stack lies on a stable base plate 30, the base plate 30 closing an insertion opening of the housing 3. For example, FIGS. 3 and 4 show a base plate 30 which is welded on the edge side in the insertion opening. The housing 3 has been manufactured, for example, from cast aluminum.

However, the housing 3 can also be a plastic housing. It can consist of an upper and a lower trough-like housing half. It is advantageous, however, if the housing 3 consists of a trough-like part and a planar cover part, produced by means of the abovementioned base plate 30 (FIGS. 2-4 and 6).

The inlet 5, the outlet 4 and a connecting stub 60 of the ventilating member 6 are arranged on an underside of the gas cooler in an installed position of the gas cooler.

The inlet 5 and the outlet 4 are also equipped with corresponding connecting stubs 40, 50. All the stubs 40, 50, 60 have been brazed into corresponding openings of the base plate 30. Accordingly, no further mechanical seal is required, which seal tends to leak after certain service times and under the effect of vibrations.

Figure 7:
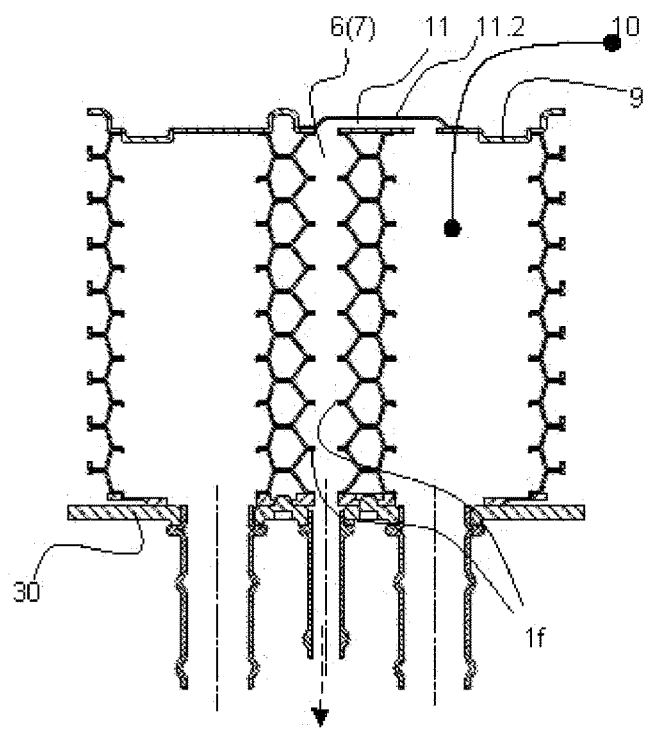
FIGS. 7-9 show a slightly modified further exemplary embodiment.
Figure 8:
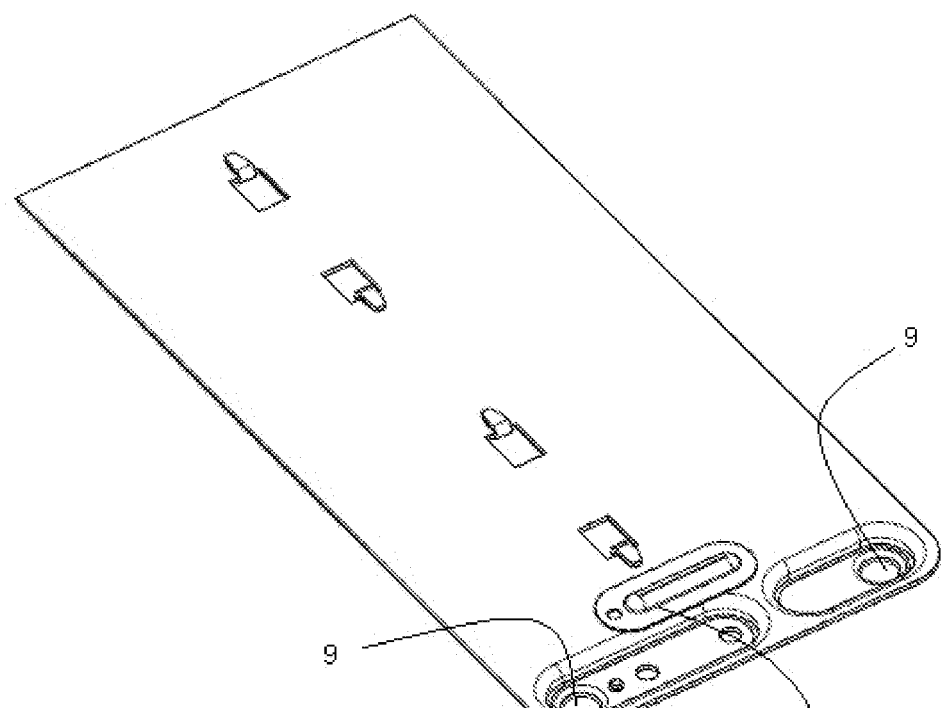
Figure 9:
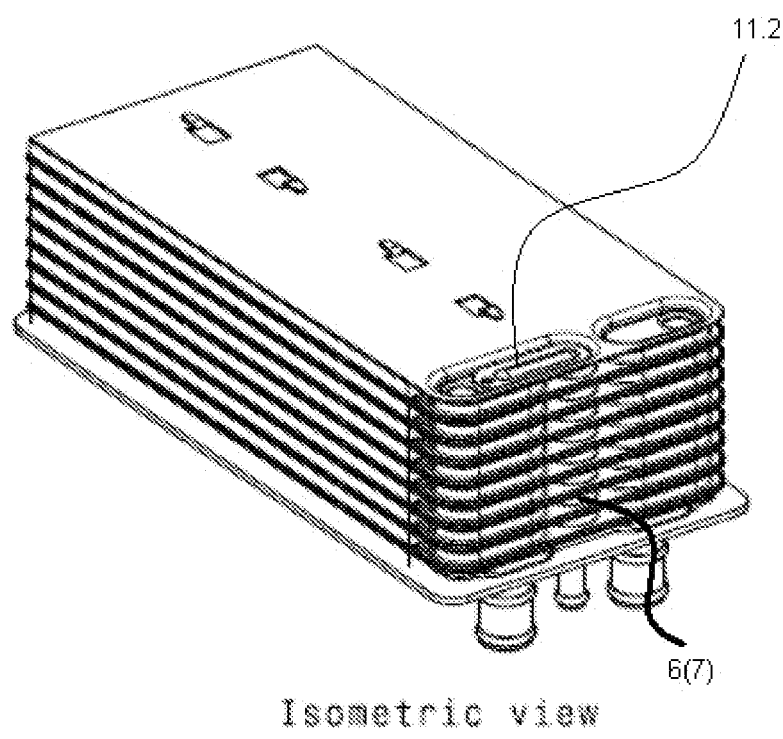
Figure 10:
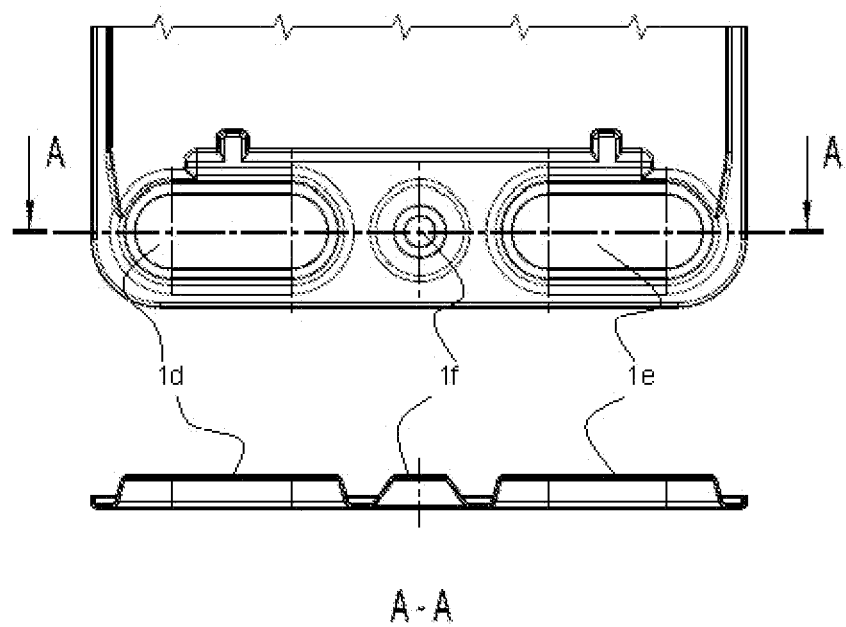
FIGS. 10 and 11 show a different modification.

A further noteworthy feature of the embodiment according to FIGS. 7-9 consists in that, in two of its corner regions, the upper plate contains shaped-out moldings which bear the designation 9. Said shaped-out moldings 9 (of circular design in the exemplary embodiment) bring about simpler pre-assembly of the plate stack, since they produce a positioning aid.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. An indirect gas cooler, comprising:
    a plurality of stacked pairs of plates with fins arranged between adjacent pairs to define a stack within which a cooling liquid flows;
    a housing surrounding the stack and through which the gas flows to be cooled by the stack;
    an upper plate including a first depression and a second depression, each of the first depression and the second depression extending from a top surface of the upper plate and each having side walls and a bottom planar wall, wherein each of the bottom planar walls is joined to a top end of the stack;
    a covering plate extending at least partially over the first depression to at least partially cover the first depression and being at least partially spaced apart from the bottom planar wall of the first depression;
    an inlet space and an outlet collecting space extending through the stack for the cooling liquid, the inlet space and the outlet collecting space being connected by ducts within each of the pairs of plates;
    a ventilating duct extending through the stack and being open at a top end of the ventilating duct and at a bottom end of the ventilating duct to receive entrained air from the cooling liquid at the top end of the ventilating duct, dropping the entrained air through the ventilating duct, and draining the entrained air from the ventilating duct at the bottom end of the ventilating duct, wherein the ventilating duct is hydraulically connected to one of the inlet space and the outlet collecting space, wherein the ventilating duct is formed by aligned openings of the plates, and wherein the ventilating duct and said one of the inlet space and the outlet collecting space are hydraulically connected by way of a connecting duct extending within the first depression of the upper plate, the connecting duct being defined by the covering plate and the first depression; and a connecting stub arranged at an end of the stack opposite the upper plate and at the bottom end of the ventilating duct to drain the entrained air from the bottom of the gas cooler, wherein the connecting stub is hydraulically connected to the ventilating duct to form a ventilating member, wherein the connecting stub is aligned with the ventilating duct and extends from an underside of the gas cooler parallel to a stacking direction of the stack in an installed position of the gas cooler.

2. The indirect gas cooler of claim 1, wherein the connecting stub is a first connecting stub, further comprising:
a second connecting stub arranged at the end of the stack opposite the upper plate and hydraulically connected to the inlet space to provide a cooling liquid inlet; and
a third connecting stub arranged at the end of the stack opposite the upper plate and hydraulically connected to the outlet collecting space to provide a cooling liquid outlet.

3. The indirect gas cooler of claim 2, further comprising a baseplate arranged at the end of the stack opposite the upper plate, the first, second, and third connecting stubs being joined to the baseplate and hydraulically connected to the ventilating duct, the inlet space, and the outlet collecting space through the baseplate.

4. The indirect gas cooler of claim 3, wherein the stack of plate pairs and fins, the baseplate, and the first, second, and third connecting stubs are brazed together in one step.

5. The indirect gas cooler of claim 3, wherein the housing comprises a trough-like part surrounding the stack and an insertion opening through which the stack is inserted into the housing, the insertion opening being closed by the baseplate.

6. The indirect gas cooler of claim 1, wherein the inlet space is defined by aligned inlet-side openings of the plates and the outlet collecting space is defined by outlet side openings of the plates, and wherein the aligned openings forming the ventilating duct are arranged between the inlet-side and the outlet-side plate openings.

7. The indirect gas cooler of claim 1, wherein each of the plurality of stacked pairs of plates includes a cut-out, the ventilating duct and the one of the inlet space and the outlet collecting space to which the ventilating duct is hydraulically connected being arranged on one side of the cut-out and the other of the inlet space and the outlet collecting space being arranged on the other side of the cut-out.

8. The indirect gas cooler of claim 1, wherein the bottom planar wall of the first depression extends from the ventilating duct to one of the inlet space and the outlet collecting space, being joined to the ventilating duct and to one of the inlet space and the outlet collecting space.

9. The indirect gas cooler of claim 1, wherein the bottom planar wall of the first depression has a first aperture extending therethrough in alignment with the ventilating duct and a second aperture extending therethrough in alignment with one of the inlet space and the outlet connecting space.

10. The indirect gas cooler of claim 1, wherein the bottom planar wall of the second depression extends continuously across and caps one of the inlet space and the outlet collecting space.

11. The indirect gas cooler of claim 3, further comprising a lower plate having three lower plate openings, wherein the lower plate is arranged between the stack and the baseplate, being joined to both a bottom end of the stack and to the baseplate and aligned with the stack and the baseplate such that the three lower plate openings are each aligned with one of the baseplate openings and one of the ventilating duct, the inlet space, and the outlet connecting space.

12. A charge air cooler that cools charge air flowing through a housing for an internal combustion engine, comprising:
a housing including an air inlet, an air outlet, and an insertion opening, the insertion opening being arranged at a bottom end of the housing;
a stack arranged within the housing between the air inlet and the air outlet, the stack including a plurality of fins and a plurality of plates, each of the plurality of plates having an inlet opening, an outlet opening, a cut-out, and a ventilating opening, wherein the inlet openings of the plurality of plates are aligned to define an inlet space of the stack, wherein the outlet openings of the plurality of plates are aligned to define an outlet collecting space of the stack, wherein the ventilating openings of the plurality of plates are aligned to define a ventilating duct of the stack, and wherein each plate of the plurality of plates is paired with another plate of the plurality of plates to define a pair of plates of at least two pairs of plates;
an upper plate joined to one of the pairs of plates at a top end of the stack and extending across the inlet space, the outlet collecting space, and the ventilating duct of the stack, the upper plate including a cover extending over the inlet space, a cut-out, a first connection hole aligned with the ventilating duct, a second connection hole aligned with the outlet collecting space, and a connecting duct extending between the first connection hole and the second connection hole;
a covering part joined to the upper plate and covering the connecting duct;
a lower plate joined to another one of the pairs of plates; and
a baseplate joined to the lower plate at a bottom end of the stack and located at the insertion opening to close the insertion opening, the baseplate including three baseplate openings;
wherein the upper plate cover closes the inlet space,
wherein the inlet space and the outlet collecting space are fluidly connected by a duct within each of pair of plates,
wherein at least one fin of the plurality of fins is arranged between the upper plate and the stack,
wherein the cut-outs of the plurality of plates are aligned,
wherein the cut-out of the upper plate is aligned with the cut-outs of the plurality of plates,
wherein the lower plate and the baseplate each extend across the cut-outs, and
wherein the ventilating duct extends through the stack adjacent to the cut-outs of the plurality of plates allowing entrained air within the plurality of plates to exit the charge air cooler below the stack through the baseplate.

13. The charge air cooler of claim 12, wherein at least one fin of the plurality of fins is located between the at least two pairs of plates.

14. The charge air cooler of claim 12, wherein the lower plate has three lower plate openings, and wherein the baseplate is aligned with the lower plate such that one of each of the three lower plate openings is aligned with one of each of the baseplate openings.

* * * * *